July 21, 1959     H. B. IRWIN     2,895,255

FISHING FLOAT

Filed Aug. 18, 1958

INVENTOR.
HARRY BASIL IRWIN
BY
HIS ATTORNEYS

United States Patent Office 2,895,255
Patented July 21, 1959

2,895,255

FISHING FLOAT

Harry Basil Irwin, Dayton, Ohio, assignor to Dayton Bait Co., a corporation of Ohio Application August 18, 1958, Serial No. 755,739

7 Claims. (Cl. 43—44.88)

This invention relates to improvements in fishing floats and more particularly to a float provided with means for detachably engaging a fishing line, however, the invention is not necessarily so limited.

This application is a continuation-in-part of my co-pending application for a Fishing Float, Serial No. 486,578, filed February 7, 1955, such application being a continuation-in-part of my application Serial No. 427,181, filed May 3, 1954, now United States Letters Patent No. 2,820,317.

An object of this invention is the provision of a float or bobber having new and improved means for attachment and detachment to and from a fish line.

A further object of this invention is the provision of new and improved means for attaching and detaching a fish line to two opposite poles of a float, wherein both means are actuated by a single resilient element.

A further object of this invention is the provision of means for attaching a fish line to a float, wherein attachment and detachment of the float may be made at any desired place along the length of the line.

A further object of this invention is the provision of means for releasably clamping a float to a line in such a manner that when the line is released from the clamping means the float is free to move slidably on the line without becoming completely detached from the line.

A further object of this invention is the provision of means on a fishing float for gripping a line at a given position on the line, which means release the line when it is pulled away from the float, as occurs when the line is reeled in with a rod and reel assembly until the tip of the rod engages the float thereon and the line is thereafter pulled away from the float by further reeling action.

Other objects and advantages reside in the construction of parts, the combination thereof, the method of manufacture and the mode of operation, as will become more apparent from the following description.

Figure 1:
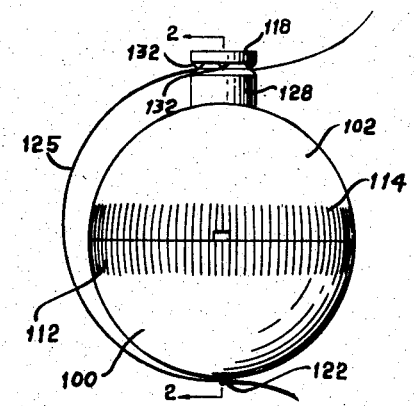
Figure 1 is an elevational view of the fishing float in its assembled form.

Referring to the drawing in greater detail, a pair of partially hollow members 100 and 102 each of hemispherical shape are secured together to form a spherical ball which is the float of this invention. An internal annular stepped-in flange portion 104 in the member 100 provides an annular shoulder 105. This configuration is complemented by a corresponding annular overlapping flange portion 106 on the exterior edge of the member 102 providing an annular shoulder 107. The flanges 104 and 106 telescope and the shoulders 105 and 107 abut to form an inconspicuous water tight seam as the members 100 and 102 are assembled into a sphere.

The hemispherical members 100 and 102 may be made of a plastic material, a light weight metal, or any other material which is both light in weight and impervious to water.

Ordinarily, a hollow light weight float such as that formed herein is difficult to cast for it will not travel far when thrown. In the present invention, however, this difficulty is overcome by providing means for controlling the ultimate specific gravity of the float. To this end the flanges 104 and 106 are provided with notches 108 and 110. In the drawings, the notches 108 and 110 are illustrated in diametrically disposed pairs, however, it is to be understood that the invention is not limited to this number of notches or to the particular locations illustrated.

The notches 108 and 110 are so located that when the hemispherical members 100 and 102 are rotated with respect to one another the notches 108 will coincide with the notches 110 to form diametrically disposed openings in the walls of the float. The arrangement is then such that one of the openings of the float may be immersed in water to allow water to enter the interior of the float until the desired weight or specific gravity is obtained. In this operation the diametrically opposite opening allows air to be displaced from the interior of the float by the incoming water. Once the desired specific gravity is obtained the openings to the interior of the float may be closed by rotating the hemispherical members 100 and 102 to misalign the notches 108 and 110.

In consequence of the foregoing construction it is possible to trap water within the interior of the float to thereby adjust the weight of the float as desired. This permits the fisherman using the float to adjust its weight to meet his personal casting needs.

The manipulation of the hemispherical members of the float is facilitated through the provision of hand grips or knurled portions 112 and 114 on the hemispherical members 100 and 102, respectively, as shown in Figure 1.

The hemispherical members 100 and 102 are resiliently connected by the following structure. Projecting from the interior surface of the member 100 is a hollow cylindrical portion 111. The member 102 is provided with a complementary inwardly extending hollow cylindrical portion 113 having a stepped portion 115 telescopically receiving the inner end of the portion 111. The stepped portion 115 cooperates with the portion 111 to form a water tight seal. The portion 113 with its stepped portion 115 and the portion 111 form a continuous tubular structure extending diametrically across the interior of the float.

A wire-like rod or stem 116 extends diametrically across the float within the tubular structure formed by the portions 111 and 113. One end of the rod is embedded in a cylindrical head or plunger 118. The other end of the rod projects through an opening 120 in the wall of the hemispherical member 100 and there is formed into a hook element 122. An eccentrically positioned notch 124 is provided in the wall of the member 100 adjacent the opening 120 for receiving the end of the hook 122.

A compression spring 126 is positioned in the hollow cylindrical portion 113. A seat or shoulder 117 is formed within the portion 113 and one end of the spring 126 rests on this shoulder. The opposite end of the spring 126 is engaged by an inverted cup-shaped member 128 which telescopes within the wall of the hollow cylindrical portion 113. This member 128 is provided with an opening at its end through which a boss 130 on the plunger 118 extends.

The construction is such that with the hook 122 at one end of the rod 116 engaging the outer wall of the hemispherical member 100, the spring 126 is under compression biasing the cup-shaped member 128 against the plunger 118 at the opposite end of the rod 116. Through actuation of the spring 126 against the annular shoulder 117 in the cylindrical portion 113 the hemispherical members 100 and 102 are biased together.

Figure 2:
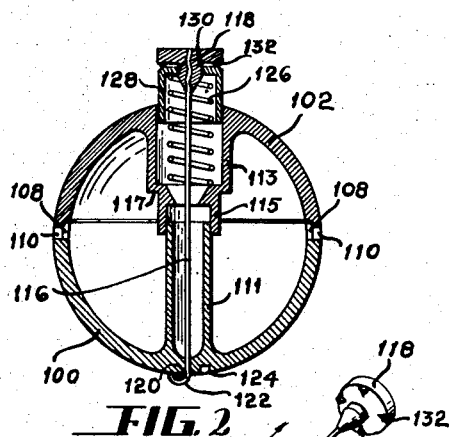
Figure 2 is a vertical sectional view taken substantially on the line 2—2 of Figure 1.
Figure 5:
Figure 5 is a detailed view partly in section of the modification in Figure 4 showing the sliding engagement of the fishing line at the bottom of the float.

When the plunger 118 is pressed inwardly of the float, the hook 122 is moved away from the opposite end of the float. This provides clearance for slipping a fish line such as that shown at 125 into engagement with the hook 122. Thereafter when the pressure upon the plunger 118 is released, the hook 122 reengages the surface of the float forming a closed eye slidably engaging the line. This type of engagement is shown in Figures 2 and 5.

The attachment with the line 125 may be made non-sliding by turning the hook 122 so that it seats in the notch 124 whereupon the hook 122 clamps the line against the wall of the float.

Figure 3:
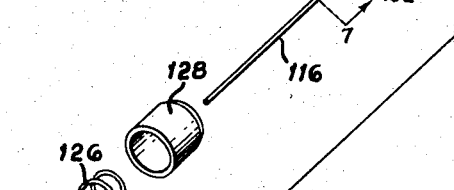
Figure 3 is an exploded view of the elements of the float in their relative positions prior to assembly.
Figure 7:
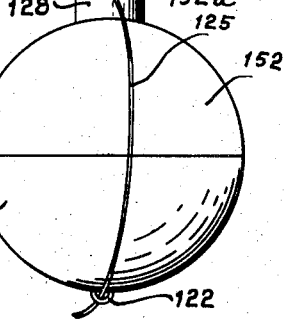
Figure 7 is an enlarged sectional view taken substantially along the line 7—7 of Figure 3.

As best seen in Figures 3 and 7, the under surface of the plunger 118 is provided with a series of projections 132 located adjacent its outer periphery. With reference particularly to Figure 7, the projections 132 are depicted in the form of three-sided pyramids. Each has a face 132a substantially tangential at its base to the outer margin of the plunger 118 and sloping radially inwardly from this margin. The other two faces of each of these projections engage in line contact along an edge designated by the reference numeral 132b, this edge sloping radially inwardly of the plunger 118 from the apex of the projection to its base.

Figure 4:
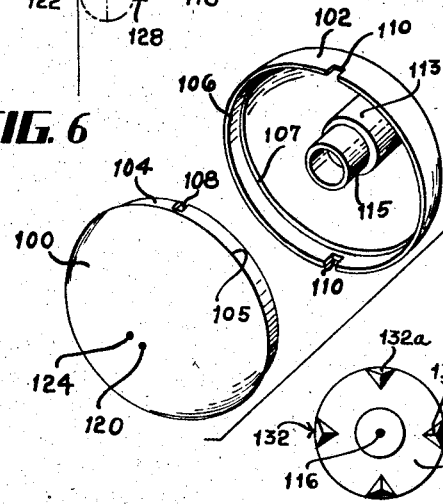
Figure 4 is an elevational view of a modification showing the frictional engagement of a fishing line at the top of the float and sliding engagement of the same line at the bottom of the float.

With reference to Figure 4 the inverted cup-shaped member 128 engaging the projections 132 is provided with a beveled surface 134 having a slope complementary to that of the outer faces 132a of the projections 132. The beveled surface 134 and the faces 132a of the projections 132 cooperate to provide a channel for guiding the fishing line into the space between the plunger 118 and the cup-shaped member 128. The plunger 118 and the cup-shaped member 128 function as clamping members for non-slidably engaging the fishing line.

The arrangement is such that a fishing line such as that shown at 125 may be drawn into the channel formed by the surface 134 and the faces 132a with sufficient force to drive the cup-shaped member 128 away from the plunger 118 against the force of the spring 126. This permits the line to slip into the space between these members and be clamped thereby.

It is to be understood that the height of the projections 132 is greatly exaggerated in the drawings for the purposes of clarity. In actual practice the height of these projections is small in comparison to the diameter of the line 125 so that after the line has slipped under one or more projections 132 between the plunger 118 and the cup-shaped member 128 the line is compressively engaged between the opposing surfaces of these members, which are essentially flat except for the presence of the projections 132 on one of them, as clearly shown in Figures 2 and 7. In other words, it is the flat surface of the plunger 118 acting with the flat surface of the cup-shaped member 128 which frictionally hold the line, while the projections 132 serve to retain the line between these clamping members. These clamping members hold the line with sufficient friction to prevent slippage of the line 125 relative to the float during normal use of the float. The amount of friction is determined in part by the tension in the spring 126.

The line 125 may be readily removed from between the clamping members by grasping the float in one hand and by pulling on one end of the line with the other hand to draw the line out from between the plunger 118 and the cup-shaped member 128. In this operation the line cams on the edge 132b of the projection 132 under which it had originally passed thereby depressing the cup-shaped member 128 inwardly sufficient to let the line slip under that projection. It is thus apparent that the sloped surfaces on the projections 132 provide for a wedging action so that the line 125 may be slipped between the plunger 118 and its complementary cup-shaped member 128 and withdrawn therefrom with no need to manually separate these members.

While the projections 132 are illustrated as pyramids, it is apparent that other shapes may be used with equal effectiveness. Thus, the projections may be cones, or hemispherical bosses or the like.

Figure 6:
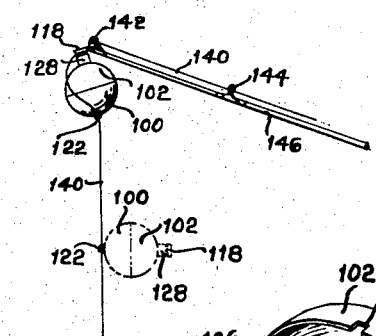
Figure 6 is an elevational view drawn to reduced scale illustrating one operating characteristic of the float.

Figure 6 illustrates an important operating characteristic of the present float. In this figure the float is illustrated in engagement with a line 140. The hook 122 engages the line 140 for sliding movement along a line.

The clamping members at the opposite pole of the float clamp a loop of the line frictionally so as to anchor the float at a predetermined position on the line.

The line passes through eyelets 142 and 144 positioned on a rod 146 and eventually passes to a reel not illustrated. The solid line detail of Figure 6 illustrates the float as it is being reeled in just at the point of contact with the eyelet 142 at the tip of the rod 146. At that instant it is evident that continued reeling in of the line 140 will cause the line to slip between the plunger 118 and the cup-shaped member 128.

It is to be noted that these clamping members each have a cylindrical periphery. Thus, when the tip of the rod engages these members as the line is reeled in it will cam on their cylindrical surfaces striving always to align the line drawn therefrom radial with respect to their common axis. In consequence of this action, the loop of line held between the clamping members will be drawn outwardly progressively closer to the margins of the clamping members. As the loop progresses outwardly, it will cam under any of the projections 132 which lie in its path and eventually free itself from the clamping members.

Once the line has been freed in this manner the float will slide freely on the line, it being secured solely by the hook 122. The float will thus drop away from the rod 146 as illustrated in broken line detail in Figure 6. In view of the automatic release characteristic described it is possible to attach the float of this invention to a fishing line associated with a rod and reel assembly without creating any interference with the reeling in operation.

By way of example, it may be desired to attach a float fifteen feet from a sinker positioned at the end of the line. If the present float is used in the manner described, it will be possible to freely reel in the line substantially to its end. With floats which more positively engage the line it would not be possible to reel in the last fifteen feet of line.

Figures 4 and 5 disclose a modification wherein two hemispherical members 150 and 152, neither of which is provided with notches to admit water, are permanently sealed together. If desired this float is preweighted in any suitable manner as it is built to provide desired casting characteristics. In this float the line engaging members 116, 118, 120, 122, 126, 128 and 132 are identical to those described in connection with the embodiment of Figures 1–3.

Although the preferred embodiment and a modification of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A fishing float adapted for use in conjunction with a rod having a fishing line, said fishing float including a main float body of buoyant material and a pair of clamping members mounted on said body for compressively clamping the fishing line, said clamping members consisting of a pair of substantially cylindrical members mounted in end-to-end relation for relative movement and spring means biasing said clamping members into compressive engagement, said clamping members being of substantially equal diameter and having opposing flat surfaces cooperating upon the insertion of a fishing line therebetween to frictionally clamp the same, means serving as a cam on one of said clamping members to spread said members apart upon engagement of the rod tip with said means, whereby said clamping members upon coming into contact with the rod tip and upon the line being pulled outwardly from between their opposing surfaces in a plane substantially parallel to such surfaces to completely release the line.

2. A fishing float adapted for use in conjunction with a rod having a fishing line, said fishing float including a main float body of buoyant material and a pair of clamping members mounted on said body for compressively clamping the fishing line, said clamping members consisting of a pair of substantially cylindrical members mounted in end-to-end relation for relative movement and spring means biasing said clamping members into compressive engagement, said clamping members being of substantially equal diameter and having opposing flat surfaces cooperating upon the insertion of a fishing line therebetween to frictionally clamp the same, one of the clamping members being provided with a projection extending from the flat surface thereof toward the flat surface of the opposing clamping member, said projection having inward and outward slanted sides and cooperating with the opposing surfaces to releasably retain the fishing line between said clamping members, said clamping members upon coming into contact with the rod tip and upon the line being pulled outwardly from between their opposing surfaces in a plane substantially parallel to such surfaces completely releasing the line.

3. A fishing float adapted for use in conjunction with a rod having a fishing line, said fishing float including a main float body of buoyant material and a pair of clamping members mounted on said body for compressively clamping the fishing line, said clamping members consisting of a pair of substantially cylindrical members mounted in end-to-end relation for relative movement and spring means biasing said clamping members into compressive engagement, said clamping members being of substantially equal diameter and having opposing flat surfaces cooperating upon the insertion of a fishing line therebetween to frictionally clamp the same, one of the clamping members being provided with a plurality of projections spaced along the margin of its flat surface and extending toward the flat surface of the opposing clamping member, said projections each having inward and outward slanted sides, the other of said members having a bevelled margin surrounding its flat surface and cooperating with the sides of said projections to form a channel for guiding the fishing line between said flat surfaces, said projections cooperating with said flat surfaces to releasably retain the fishing line between said clamping members, said clamping members upon coming into contact with the rod tip and upon the line being pulled outwardly from between their opposing surfaces in a plane substantially parallel to such surfaces completely releasing the line.

4. A fishing float adapted for use in conjunction with a rod having a fishing line, said fishing float including a main float body of buoyant material and a pair of clamping members mounted on said body for compressively clamping the fishing line, said main float body consisting of a hollow spherical body provided with a hollow cylindrical portion extending diametrically across the interior of said body, a stem extending diametrically through the hollow cylindrical portion, said stem terminating at one end in a hook portion engaging the exterior wall of said body to provide an eye through which the fishing line may freely pass, said clamping members consisting of a pair of substantially cylindrical members mounted in end-to-end relation for relative movement, said clamping members being of substantially equal diameter and having opposing flat surfaces cooperating upon the insertion of a fishing line therebetween to frictionally clamp the same, one of said clamping members being fixedly secured to the other end of the stem and projecting beyond the exterior wall of said float body, the other clamping member having an aperture through which the stem projects, and spring means biasing said other clamping member against the clamping member secured to said stem into compressive engagement, said clamping members upon coming into contact with the rod tip and upon the line being pulled outwardly from between their opposing surfaces in a plane substantially parallel to such surfaces completely releasing the line.

5. A fishing float adapted for use in conjunction with a rod having a fishing line, said fishing float including a main float body of buoyant material and a pair of clamping members mounted on said body for compressively clamping the fishing line, said main float body consisting of a hollow spherical body provided with a hollow cylindrical portion extending diametrically across the interior of said body, a stem extending diametrically through the hollow cylindrical portion, said stem terminating at one end in a hook portion engaging the exterior wall of said body to provide an eye through which the fishing line may freely pass, said clamping members consisting of a pair of substantially cylindrical members mounted in end-to-end relation for relative movement, said clamping members being of substantially equal diameter and having opposing flat surfaces cooperating upon the insertion of a fishing line therebetween to frictionally clamp the same, one of said clamping members being fixedly secured to the other end of the stem and projecting beyond the exterior wall of said float body, said one clamping member having projections with sloping sides extending from the flat surface thereof toward the other clamping member, the other clamping member having an aperture through which the stem projects, and spring means biasing said other clamping member against the clamping member secured to said stem into compressive engagement, said clamping members upon coming into contact with the rod tip and upon the line being pulled outwardly from between their opposing surfaces in a plane substantially parallel to such surfaces completely releasing the line.

6. A fishing float adapted for use in conjunction with a rod having a fishing line, said fishing float including a main float body of buoyant material and a pair of clamping members mounted on said body for compressively clamping the fishing line, said clamping members consisting of a pair of substantially cylindrical members mounted in end-to-end relation for relative movement and spring means biasing said clamping members into compressive engagement, said clamping members being of substantially equal diameter and having opposing flat surfaces cooperating upon the insertion of a fishing line therebetween to frictionally clamp the same, one of the clamping members being provided with a plurality of projections extending from the flat surface thereof toward the flat surface of the other clamping member, each of said projections being provided with sloping sides, at least one of the projections cooperating with the flat surfaces to releasably retain the fishing line, said clamping members upon coming into contact with the rod tip and upon the line being pulled outwardly from between their opposing surfaces in a plane substantially parallel to such surfaces completely releasing the line.

7. A fishing float according to claim 1, wherein the main float body has mounted thereon a passage through which the fishing line moves without being clamped.

References Cited in the file of this patent
UNITED STATES PATENTS

| | | |
|---|---|---|
| 418,995 | Tufts | Jan. 7, 1890 |
| 1,259,664 | Peters | May 19, 1918 |
| 2,560,129 | Rhotehamel | July 10, 1951 |
| 2,597,836 | Kile | Mar. 20, 1952 |
| 2,706,869 | Schornfelt | Apr. 26, 1955 |
| 2,758,410 | Cowsert | Aug. 14, 1956 |
| 2,787,079 | Wilson | Apr. 2, 1957 |